Patented June 2, 1936

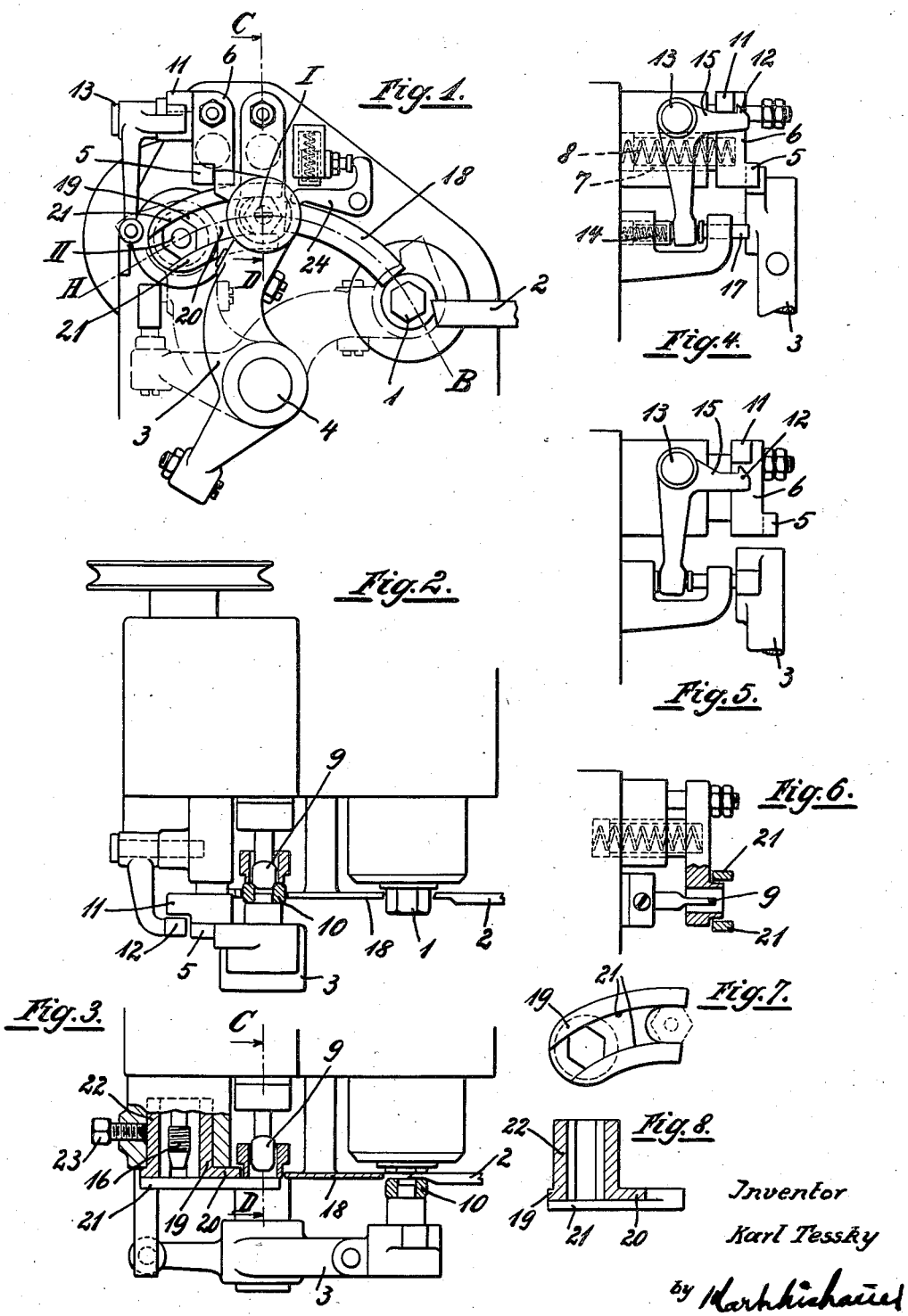

2,042,687

UNITED STATES PATENT OFFICE 2,042,687

AUTOMATIC LATHE

Karl Tessky, Esslingen-on-the-Neckar, Germany

Application May 22, 1935, Serial No. 22,675
In Germany May 28, 1934

6 Claims. (Cl. 29—51)

My invention relates to automatic lathes and more especially to such lathes, in which the work piece is machined at different stations.

In lathes of this latter kind the work piece is fed to the several stations in succession by grippers which feed the work piece, such as for instance a hexagon nut, after it has been shaped on the lathe spindle, thereafter bored, countersunk on the front side and thereafter cut off from the bar, to two further working stations in succession, for instance first to a countersink, where the rear end of the boring is countersunk and thereafter to a screw tap, the gripper itself executing at the same time a transversal movement, preferably an oscillatory movement from one station to the other and, at the single stations, such movements in the direction of the axis of the work piece, as are required for the operation to be gone through at each station, for the feed of the work piece to the tool and for its withdrawal from this station. In order that the gripper, during its transversal movement, always attain its new working position, a check or the like is required.

After the work piece has been acted upon, for instance after the rear end of the boring has been countersunk, the gripper, while returning in axial direction into its initial position, is not able to simply move further into the working station next following, for instance for thread cutting, since the check would prevent it from oscillating further in the same plane. For this reason the gripper is as a rule required to execute an additional movement to avoid the check, and this creates the danger that the work piece is not securely guided and held any more so that the movement of the gripper is disturbed. This as well as the additional movements of the gripper, which are not required for the work proper, considerably impair the output of the lathe.

According to the present invention, now, these additional movements of the gripper and the disturbances and losses of time thereby created, are avoided altogether by rendering the throwing out of the check, which may for instance be apportioned to the first working stage (for instance the countersinking stage), dependent from a working movement of the gripper itself, i. e. a movement of the gripper, which is required by the work of the lathe and preferably a movement during which the gripper feeds the work piece towards the tool. The check may then be thrown in again, for another stopping of the gripper, by a further working movement of the gripper, which this latter is required to execute in the working station next following.

In the drawings affixed to this specification and forming part thereof, an automatic lathe embodying my invention is illustrated diagrammatically by way of example.

In the drawings,

Fig. 1 is an end elevation illustrating the work piece feed in the direction of the spindle axis and the axis of oscillation of the gripper, which latter is shown in position at the first station.

Fig. 2 is a plan view, partly in section on the curved line A—B in Fig. 1.

Fig. 3 is a similar view, showing the gripper in front of the lathe spindle.

Fig. 4 is a side elevation showing the check thrown out and in locked position.

Fig. 5 is a similar view with the check in operative position.

Fig. 6 is a section on the line C—D in Fig. 1.

Fig. 7 is an end view, similar to that shown in Fig. 1, and

Fig. 8 is a section on the line A—B in Fig. 1, of the work piece guide.

Figure 9:
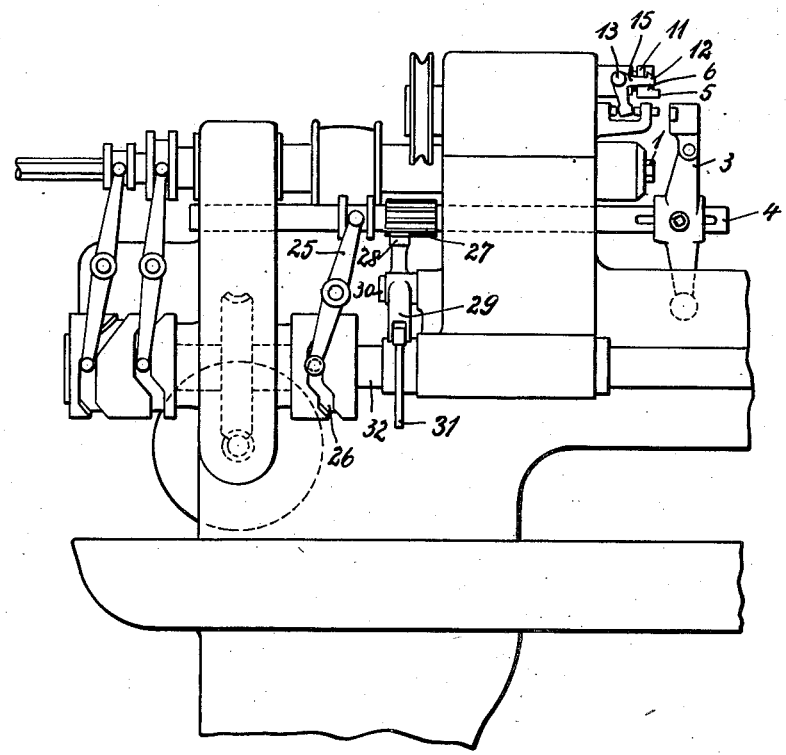
Fig. 9 is an elevation of part of the lathe, drawn to a smaller scale and illustrating the means for operating the parts shown in Figs. 1 to 8.

Referring to the drawings, the lathe here shown serves for manufacturing hexagon nuts from hexagonal bars, the nuts being bored, countersunk at the front end, turned and cut off, whereupon they are fed by the gripper to the first working station, to be acted upon by a countersink, which acts on the rear end of the bore, whereupon it is conveyed to another station, in which a screw tap cuts the inner thread.

In the drawings the axes of these two stations are marked I and II.

I is the end of the hexagonal metal bar mounted in the lathe spindle and 2 is the cutting off tool, while 3 is the gripper arm and 4 is the rock shaft carrying same into the several working positions in succession. 5 is a check provided for the first station and 6 is the body carrying this check. The body 6 is displaceable in parallel to the axis of oscillation 4 of the gripper on a hollow guide pin 7 acted upon by a spring 8. The head of the gripper arm 3 and the check 6 are so shaped and coordinated, that at the station I the head of the gripper partly overlaps the check body 6, as shown in Fig. 1.

In order now that the tool (countersink 9) at the station I be able to act on the work piece 10 (Figs. 2 and 3), the gripper is required to execute a movement in the direction of its axis of oscillation and consequently also the axis of the countersink 9 and work piece 10. In executing this movement the head of the gripper pushes the check body 6 back until a nose 11 forming part of the body 6 has receded behind the nose 12 of an angle lever 15 arranged for oscillation about a pin 13 and acted upon by a spring bolt 14. When, on the countersink having acted upon the nut, the gripper recedes in axial direction, the check 5 is unable to follow. As soon as the gripper has returned to the same position which it had taken up at its arrival at station I, it is free to proceed to station II without being hindered by the check and, through a corresponding axial movement, to feed the work piece to the screw tap 16 and to push it over the tap, while the thread is being cut. In this thread cutting station II, which is shown, similarly to station I, in Fig. 1 in dash lines, the head of the gripper overlaps an axially movable pin 17 (Fig. 5), which acts on the angle lever 15 in such manner, that the axial movement of the gripper head causes the pawl 12 of lever 15 to be thrown out and to release the nose 11, so that on moving from the position shown in Fig. 4 to that shown in Fig. 5, the check body together with the nose 11 and check 5 is enabled to move back into its initial operative position.

After the thread cutting procedure has been gone through, the gripper recedes so far in axial direction, that it is free to swing back freely into station I without being hindered by the check 5.

In order to prevent the work piece 10 cut off from the bar and conveyed by the gripper from dropping off during the transversal movement, a guide rail 18 of a well known kind is provided in the path of the gripper head. With this guide rail is connected a curved guide 19, which guides the work piece 10, after it has been adjusted by a rock lever 24 at two diametrically opposed faces, thereby preventing any undesirable turning of the work piece. At the stations I and II the work piece is guided in openings of the guide 19, while between these two positions a web 20 is left (Fig. 8), which acts as a guide similarly to the guide rail 18. The faces of the hexagon are guided at the working stations by the lateral faces 21 of the guide piece 19. Preferably all these guiding means are made in one piece, a hub like extension 22 of which is mounted for rotation about the axis of the screw tap 16 and can be fixed in position by means of a set screw 23. I am hereby enabled to adjust and fix the guide faces of the guide piece 19 in correct position with regard to both stations.

The axial displacement of the shaft 4 carrying the gripper arm 3 is effected in a well known manner by an angle lever 25 (Fig. 9) mounted for rocking motion and projecting with its free arm into a cam groove 26 on the control shaft 32 of the lathe. The rocking motion of the gripper arm 3 is controlled by a toothed gear 27 mounted on the gripper shaft 4, into which projects a toothed segment 28 mounted on a cam lever 29, which is arranged for rocking motion about a pin 30 and is acted upon by an eccentric 31 carried by the shaft 32.

Obviously this invention is not limited to the case, where the gripper feeds the work piece from the lathe spindle to two other working stations, since any number of such working stations may be served by the gripper. In that case a corresponding number of checks and throwing out and releasing means must be provided.

Similarly the kind of operation performed on the work piece may vary. Instead of the countersink a slitting saw and in the place of a screw tap another boring tool or countersink or the like may be provided.

This invention is further not limited to grippers mounted for reciprocatory motion, but may also be applied to grippers arranged for continuous motion in the same direction, as also for multiple grippers. It may also be applied to grippers, which instead of moving in a circular curve, execute a straight line or other movement from one station to the other.

Instead of utilizing the feed movement of the gripper for throwing out and in of the checks, I may also utilize for this purpose the return movement of the gripper or part of these movements. I may further bring about the throwing in of the check or checks by the continuation of the rocking or transversal movements of the gripper.

Instead of rendering the check operative by axial displacement, it might also be moved into operative and inoperative position by an oscillatory movement.

The means for locking and releasing the check may be arranged differently as here shown and described.

Obviously this invention may also be applied to the manufacture of screws and other work pieces of any kind, size and form and also solid and cylindrical work pieces.

I wish it to be understood that I do not desire to be limited to the exact details of construction shown and described for obvious modifications will occur to a person skilled in the art.

I claim:—

1. In an automatic lathe in combination, a gripper for feeding a work piece to a plurality of working stations in succession, a reciprocable check adapted to limit the feed movements of said gripper and means arranged for cooperation with said gripper for governing the movements of said check by the feed movements of said gripper.

2. In an automatic lathe in combination, a gripper for feeding a work piece to a plurality of working stations in succession, a reciprocable check adapted to limit the feed movements of said gripper, means for displacing said gripper at right angles to the direction of feed, and means arranged for cooperation with said gripper for governing the movements of said check by the feed movements of said gripper.

3. In an automatic lathe in combination, means for feeding a work piece to a plurality of working stations in succession, a reciprocable check, a spring acting on said check, means associated with said feeding means for governing the movements of said check and for moving same into inoperative position and means for locking said check in this position.

4. In an automatic lathe in combination, means for feeding a work piece to a plurality of working stations in succession, a reciprocable check, a spring acting on said check, means associated with said feeding means for governing the movements of said check and for moving same into inoperative position, means for locking said check in this position, and means in the path of said feeding means for releasing said check from its inoperative position.

5. In an automatic lathe in combination, means for feeding a work piece to a plurality of working stations in succession, a reciprocable check adapted to limit the feed movements of said feeding means, means arranged for cooperation with said feeding means for governing the movements of said check by the feed movements of said feeding means, and guiding means in one piece for guiding the work piece in two working positions.

6. In an automatic lathe in combination, means for feeding a work piece to a plurality of working stations in succession, a reciprocable check adapted to limit the feed movements of said feeding means, means arranged for cooperation with said feeding means for governing the movements of said check by the feed movements of said feeding means and guiding means in one piece, arranged for adjustment about the working axis, for guiding the workpiece in two working positions.

KARL TESSKY.